(12) United States Patent
Pottier et al.

(10) Patent No.: US 12,400,636 B2
(45) Date of Patent: Aug. 26, 2025

(54) METHODS AND APPARATUS FOR TRAINING A CLASSIFICATION DEVICE WITH CONSTRAINED CAPABILITIES

(71) Applicant: Arm Limited, Cambridge (GB)

(72) Inventors: Remy Pottier, Grenoble (FR); Wei Yuan, Milpitas, CA (US); James Edward Myers, Great Wilbraham (GB); Andrew William Dunn, Sudbury (GB); Noel Francis Hurley, St Albans (GB)

(73) Assignee: Arm Limited, Cambridge (GB)

( * ) Notice: Subject to any disclaimer, the term of this patent is extended or adjusted under 35 U.S.C. 154(b) by 515 days.

(21) Appl. No.: 17/530,200

(22) Filed: Nov. 18, 2021

(65) Prior Publication Data
US 2023/0154454 A1 May 18, 2023

(51) Int. Cl.
*G10L 15/06* (2013.01)
*G05B 19/042* (2006.01)
(Continued)

(52) U.S. Cl.
CPC .......... *G10L 15/063* (2013.01); *G05B 19/042* (2013.01); *G06N 20/00* (2019.01);
(Continued)

(58) Field of Classification Search
CPC .................. G10L 15/063; G10L 15/22; G10L 2015/0638; G10L 2015/227; G05B 19/042; G05B 2219/2642; G06N 20/00; G06N 5/01; B60R 16/0373; B60R 25/01; B60R 25/1003; B60R 25/257; E05F 15/73; E05F 2015/763; E05F 2015/767; E05Y 2400/45; E05Y 2400/858; E05Y 2900/531; E05Y 2900/536; E05Y 2900/548; G06F 3/017;
(Continued)

(56) References Cited

U.S. PATENT DOCUMENTS 11,010,428 B2 * 5/2021 Lewis .................. G06F 40/134
11,527,237 B1 * 12/2022 Sarikaya ................ G10L 15/16
(Continued)

FOREIGN PATENT DOCUMENTS

EP          2200021 A1 * 6/2010 ......... G01C 21/3608
WO   WO-2019143614 A1 * 7/2019 ....... G06F 16/90332

OTHER PUBLICATIONS

Notification of Transmittal of the International Search Report and the Written Opinion of the International Searching Authority, or the Declaration, App. No. PCT/GB2022/052721, Mailed Mar. 13, 2023, 19 pages.
(Continued)

*Primary Examiner* — Michael N Opsasnick
(74) *Attorney, Agent, or Firm* — Berkeley Law & Technology Group, LLP

(57) ABSTRACT

A method for training a classification device, the method comprising: receiving classification device constraints at an intermediary device; receiving training data at the intermediary device; matching the training data to the classification device constraints to provide constrained training data; mapping the constrained training data to classification device functionality to provide a command model; and transmitting the command model to the classification device.

19 Claims, 2 Drawing Sheets

(51) Int. Cl.
    *G06F 18/214*     (2023.01)
    *G06F 18/24*     (2023.01)
    *G06F 21/31*     (2013.01)
    *G06N 20/00*     (2019.01)
    *G10L 15/22*     (2006.01)
    *B60R 16/037*     (2006.01)
    *B60R 25/01*     (2013.01)
    *B60R 25/10*     (2013.01)
    *B60R 25/25*     (2013.01)
    *E05F 15/73*     (2015.01)

(52) U.S. Cl.
    CPC .......... *G10L 15/22* (2013.01); *B60R 16/0373* (2013.01); *B60R 25/01* (2013.01); *B60R 25/1003* (2013.01); *B60R 25/257* (2013.01); *E05F 15/73* (2015.01); *E05F 2015/763* (2015.01); *E05F 2015/767* (2015.01); *E05Y 2400/45* (2013.01); *E05Y 2400/858* (2013.01); *E05Y 2900/531* (2013.01); *E05Y 2900/536* (2013.01); *E05Y 2900/548* (2013.01); *G05B 2219/2642* (2013.01); *G10L 2015/0638* (2013.01); *G10L 2015/227* (2013.01)

(58) Field of Classification Search
    CPC ........ G06F 18/214; G06F 18/24; G06F 18/40; G06F 21/31
    See application file for complete search history.

(56)     References Cited

U.S. PATENT DOCUMENTS

| | | | |
|---|---|---|---|
| 2006/0293891 A1* | 12/2006 | Pathuel | G06F 21/32 |
| | | | 704/E17.003 |
| 2014/0365068 A1 | 12/2014 | Burns et al. | |
| 2017/0289341 A1* | 10/2017 | Rodriguez | H04M 1/72448 |
| 2017/0359314 A1* | 12/2017 | Mathias | H04L 67/06 |
| 2019/0034156 A1* | 1/2019 | Kim | H04M 1/725 |
| 2021/0065712 A1* | 3/2021 | Holm | G10L 15/02 |
| 2022/0157318 A1* | 5/2022 | Sharifi | G10L 15/22 |

OTHER PUBLICATIONS

Hakkila, et al., "Personal Customisation of Mobile Phones—A Case Study," NordiCHI 2006: Changing Roles, Oct. 14-18, 2006, 4 pages.

Notification Concerning Transmittal of International Preliminary Report on Patentability, App. No. PCT/GB2022/052721, Mailed May 30, 2024, 11 pages.

\* cited by examiner

METHODS AND APPARATUS FOR TRAINING A CLASSIFICATION DEVICE WITH CONSTRAINED CAPABILITIES

The present techniques relate to methods and apparatus for training a classification device. More particularly, the techniques relate to methods and apparatus for training a classification device, which may be in the form of a user device, using an intermediary device to extend the functionality of the classification device.

User devices may be programmed to provide specific functionality when, for example, a button on the user device is pressed. User devices may also allow the receipt of user voice commands to provide specific user device functionality. The functionality of such user devices may be fixed during production or commissioning of the user device, and such user devices may be limited in processing, storage, and communication capabilities, such that the user experience of using such a user device is not optimised.

It would therefore be desirable to provide alternative methods and apparatus.

According to a first technique, there is provided a method for training a classification device, the method comprising: receiving classification device constraints at an intermediary device; receiving training data at the intermediary device; matching the training data to the classification device constraints to provide constrained training data; mapping the constrained training data to classification device functionality to provide a command model; and transmitting the command model to the classification device.

According to a second technique, there is provided an intermediary device comprising communication circuitry to: receive classification device constraints; and receive training data; and processing circuitry to: match the training data to the classification device constraints to provide constrained training data; and map the constrained training data to classification device functionality to provide a command model; wherein the communication circuitry transmits the command model to the classification device.

According to a third technique, there is provided a system for training a classification device, comprising: an intermediary device to: receive classification device constraints; receive training data; match the training data to the classification device constraints to provide constrained training data; map the constrained training data to classification device functionality to provide a command model; and transmit the command model to the classification device; and a classification device to: provide the classification device constraints to the intermediary device; and receive the command model from the intermediary device.

Embodiments will now be described with reference to the accompanying figures of which:

Broadly speaking, embodiments of the present technique provide methods, apparatus, and systems, for optimising the functionality of a classification device by providing the classification device with a command model.

In one example, the command model may be an audio command model, in another example the command model may be an image command model.

Figure 1:
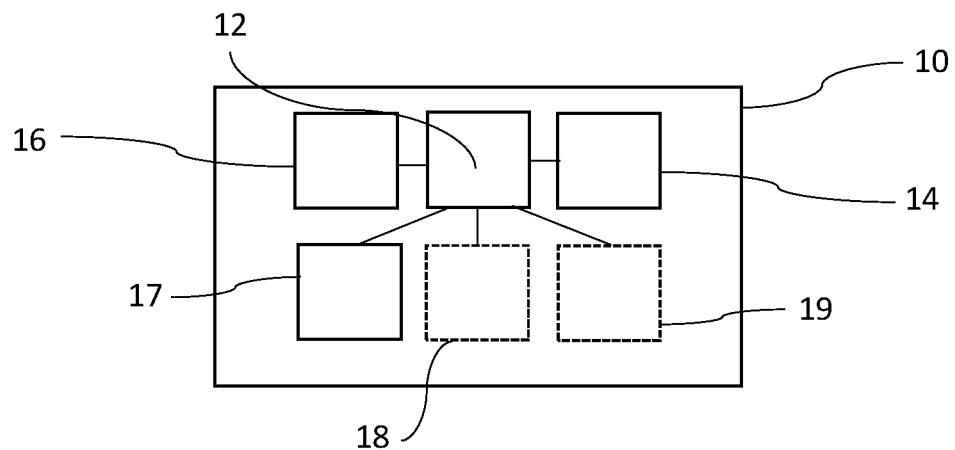
FIG. 1 illustrates a schematic diagram of an intermediary device according to various examples.

FIG. 1 illustrates a schematic diagram of an classification device 10, which may be in the form of a user device 10, suitable for communicatively coupling with an intermediary device 20 over a communication channel 30 in order to train a command model for use at the classification device 10.

Figure 2:
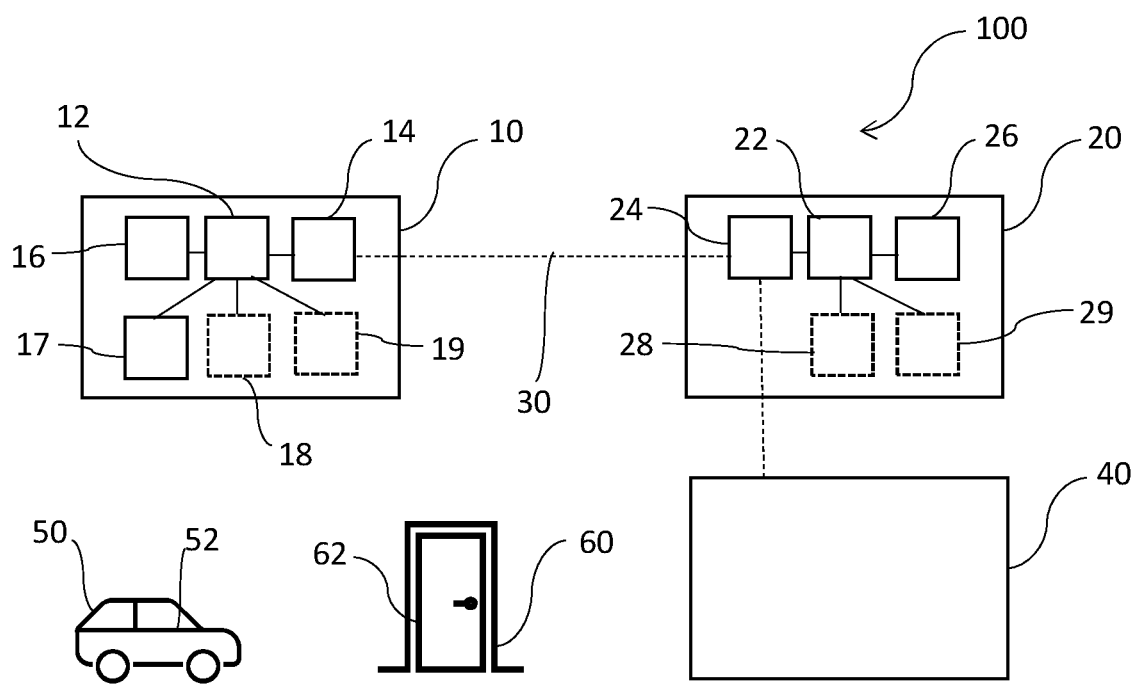
FIG. 2 illustrates a schematic diagram of a system comprising a classification device and an intermediary device according to various examples.

FIG. 2 illustrates a schematic diagram of a system 100 comprising a classification device 10 and an intermediary device 20, communicatively coupled via a communication channel 30.

In an example, methods, apparatus, and systems, are provided for optimising the functionality of a classification device 10 by providing the classification device 10 with an audio command model.

The intermediary device 20 is configured or arranged to train a classification device 10 or to facilitate training of a classification device 10. The intermediary device 20 is configured to: receive classification device constraints; receive audio training data, for example via a microphone 28 attached to or integral with the intermediary device 20; match the audio training data to the classification device constraints to provide constrained audio training data; map the constrained audio training data to classification device functionality to provide an audio command model; and transmit the audio command model to the classification device 10.

The classification device 10 is configured or arranged to provide classification device constraints to the intermediary device 20; and receive an audio command model from the intermediary device 20.

The classification device 10 may be a small, low power device, such as a remote control device, which has limited capabilities and may be configured to provide a limited array of functions to control the operation of another object, such as a vehicle 50, a building 60, or a component thereof.

The classification device 10 comprises processing means 12 in the form of a processor or processing circuitry for performing an instruction upon the activation of a button, switch, or other user engageable element 17 of the classification device 10. The processing circuitry 12 may comprise processing logic to process data, and generate output data in response to the processing.

The classification device 10 comprises communication means 14 in the form of a communication module, transmitter and receiver circuitry, or communication circuitry 14, for receiving and transmitting data.

The classification device communication means 14 may be any suitable communication means, comprising any suitable communication circuitry and using any suitable communication protocols, to transmit and receive messages (or data or data packets). The classification device communication means 14 may use any suitable communication protocol to communicate with the intermediary device, such as, but not limited to, wireless communication (e.g. WiFi), short range communication such as radio frequency communication (RFID) or near-field communication (NFC), or by using the communication protocols specified by ZigBee, Thread, Bluetooth, Bluetooth LE, IPv6 over Low Power Wireless Standard (6LoWPAN), or Constrained Application Protocol (CoAP). The communication means may use a wireless mobile (cellular) telecommunication protocol to communicate with the intermediary device, e.g. 3G, 4G, 5G, etc. The classification device 10 may communicate with the intermediary device 20 using wired communication techniques, such as via metal cables or fibre optic cables. The classification device 10 may use more than one communication technique to communicate with the intermediary device 20. For example, the communication means 14 may be in the form of a transceiver for receiving messages and/or data from the intermediary device 20 and transmitting messages and/or data to the intermediary device 20.

The classification device 10 comprises storage 16. The storage 16 may comprise a volatile memory, such as random access memory (RAM), for use as temporary memory, and/or non-volatile memory such as Flash, read-only memory (ROM), or electrically erasable programmable ROM (EEPROM), for storing data, programs or instructions.

The classification device 10 may be a vehicle remote control device, which may be intended to provide functions to control the operation of a vehicle 50 such as locking or unlocking a vehicle door, opening or closing a vehicle door, trunk, boot or other entry point to the vehicle, controlling an alarm of the vehicle, or controlling other automatable functions of the vehicle 50. Such a classification device 10 may form part of a keyless vehicle entry system.

Alternatively, or in addition, the classification device 10 may be a building remote control device, which may be intended to provide functions to control the operation of a building 60 such as a home. Such functions may include opening and closing blinds or shutters, turning lights on and off, controlling an alarm system, or controlling other automatable functions within the building 60.

The functions of the classification device 10 are generally activated or operated by the use of push buttons, switches, or other user engageable elements on the classification device 10 relating to the desired function. One or more functions may be capable of being activated by the classification device 10. Such a classification device 10 may have limited capabilities in terms of computing and electrical power. In some examples, classification devices 10 may have a small battery, to power the device, which may need to be periodically replaced, for example once per year, to ensure continued operation of the classification device 10.

The classification device 10 may comprise audio detection means 18 in the form of a microphone 18 or other audio detection or recording device for recording or detecting a user's voice or other noise. The classification device 10 may comprise image detection means 19 in the form of a camera 19 or other image capture device for imaging or detecting a user's face, hands, or other object. The purpose of these sensors 18, 19 on the classification device are described below.

The intermediary device 20 comprises processing means 22 in the form of a processor or processing circuitry 22 for performing instructions. The processing circuitry 22 may comprise processing logic to process data, and generate output data in response to the processing.

The intermediary device 20 is arranged or configured for communication with the classification device 10 via a communication channel 30. The intermediary device 20 comprises communication means 24 in the form of a communication module, transmitter and receiver circuitry, or communication circuitry 24, to enable the intermediary device 20 to communicate with other machines including the classification device 10. The intermediary device communication means 24 may be any suitable communication means, comprising any suitable communication circuitry and using any suitable communication protocols, to transmit and receive messages (or data or data packets). The intermediary device communication means 24 may use any suitable communication protocol to communicate with the classification device 10, such as, but not limited to, wireless communication (e.g. WiFi), short range communication such as radio frequency communication (RFID) or near-field communication (NFC), or by using the communication protocols specified by ZigBee, Thread, Bluetooth, Bluetooth LE, IPv6 over Low Power Wireless Standard (6LoWPAN), or Constrained Application Protocol (CoAP). The communication means may use a wireless mobile (cellular) telecommunication protocol to communicate with the classification device 10, e.g. 3G, 4G, 5G, etc. The intermediary device 20 may communicate with the classification device 10 using wired communication techniques, such as via metal cables or fibre optic cables. The intermediary device 20 may use more than one communication technique to communicate with the classification device 10. For example, the communication means 24 may be in the form of a transceiver for receiving messages and/or data from a classification device 10 and transmitting messages and/or data to a classification device 10.

The intermediary device 20 comprises storage 26. The storage 26 may comprise a volatile memory, such as random access memory (RAM), for use as temporary memory, and/or non-volatile memory such as Flash, read-only memory (ROM), or electrically erasable programmable ROM (EEPROM), for storing data, programs or instructions.

The intermediary device 20 comprises audio detection means 28, for example a microphone 28 or other audio capture device, for the detection and recording of a user's voice to provide audio training data. The audio training data is provided by a user enunciating spoken or voice commands in the vicinity of the microphone 28.

The intermediary device 20 is also able to receive classification device constraints relating to the classification device 10.

The intermediary device 20 may be a device such as a mobile phone or other microphone enabled device, such that the audio training data can be received by the microphone 28 of the intermediary device 20. A voice assistance system, such as Amazon Alexa provided via a device such as an Amazon Echo Dot, may act as an intermediary device 20 in order to receive audio training data via an associated microphone 28.

In another example, methods, apparatus, and systems, are provided for optimising the functionality of a classification device 10 by providing the classification device 10 with an image command model. Whilst most of the arrangement is similar to that of the arrangement described above in relation to an audio command model, the arrangement for providing the classification device 10 with an image command model has a few differences.

The intermediary device 20 is configured or arranged to train a classification device 10 or to facilitate training of a classification device 10. The intermediary device 20 is configured to: receive classification device constraints; receive image training data, for example via a camera 29 attached to or integral with the intermediary device 20; match the image training data to the classification device 10 constraints to provide constrained image training data; map the constrained image training data to classification device 10 functionality to provide an image command model; and transmit the image command model to the classification device 10.

The classification device 10 is similar in form to that previously described, but is configured or arranged to provide classification device constraints to the intermediary device 20 and receive an image command model from the intermediary device 20. In this example, the principles of considering the classification device constraints and transmission of a command model are as described above, but with an image command model being provided to the classification device 10 rather than an audio command model. Also, in this example, the classification device 10 comprises a low resolution camera 29 rather than, or in addition to, a microphone 28.

The intermediary device 20 comprises image detection means 29, for example a camera 29 or other image capture device, for the detection and recording of a user image to provide image training data. The image training data is provided by a user positioning their face, hands, or other element or object, in the vicinity of the camera 29. Facial recognition patterns can be used to identify key parts of the image for identifying a user in the image command model and/or identifying facial expressions of a user in the image command model. Hand gesture recognition can be used to identify particular hand gestures in the image command model.

The intermediary device 20 may be a device such as a mobile phone or other camera enabled device, such that the image training data can be received by the camera 29 of the intermediary device 20. A mobile phone, or similar device, may act as an intermediary device 20 in order to receive image training data via an associated camera 29.

A method for training a classification device 10 using an intermediary device 20 communicatively coupled to the classification device 10 via a communication channel 30 will now be described in relation to FIG. 3.

Figure 3:
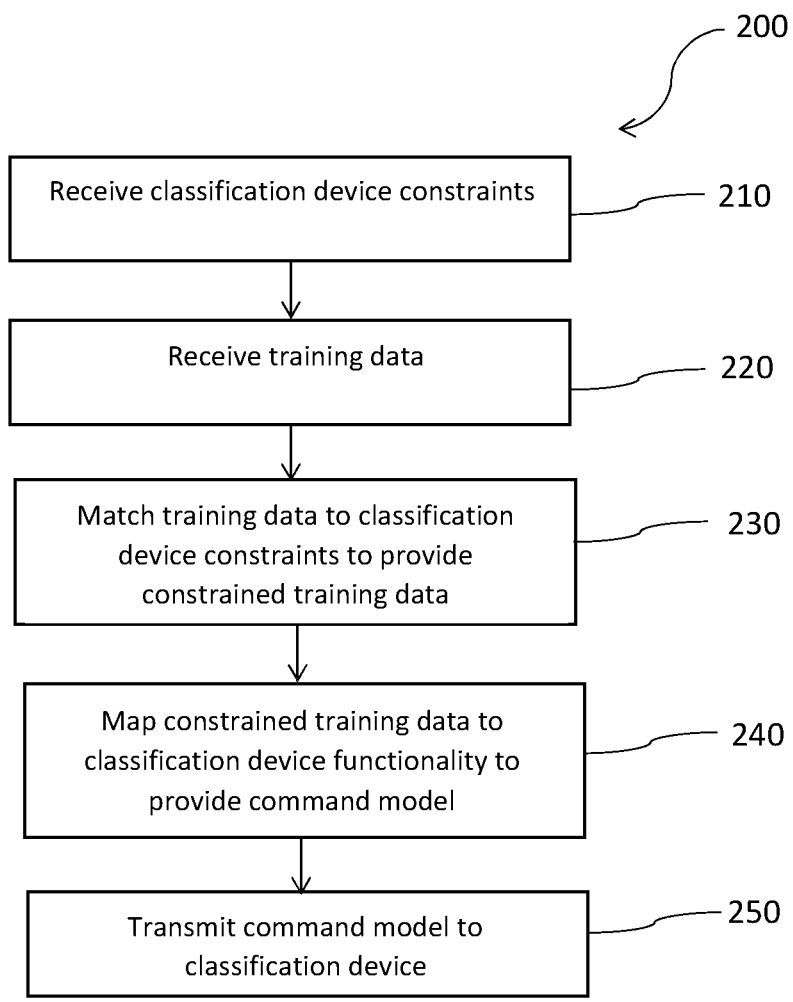
FIG. 3 illustrates a flow diagram of blocks of a method according to various examples.

FIG. 3 illustrates a method 200 for training a classification device 10. The method, at block 210, comprises receiving classification device constraints at an intermediary device. Classification device constraints may be provided by or for the classification device 10, and may be transmitted from, the classification device 10 to the intermediary device 20. Alternatively, classification device constraints may be provided to the intermediary device 20 by a third party, such as a server 40 having access to a database of classification devices 10. Classification device constraints may be provided to the intermediary device 20 using a standard over the air software transfer. Classification device constraints may be provided from the classification device 10 to the intermediary device 20 using a standard over the air software transfer.

Classification device constraints may alternatively be determined by sensor characterisation. The intermediary device 20 may characterise a sensor 18, 19 of the classification device 10 to determine the classification device constraints by interacting with the classification device 10. In particular, the intermediary device 20 may provide a known output to a sensor such as a microphone 18 or a camera 19 of the classification device 10. The intermediary device 20 may then receive a sensor response from the classification device 10 in response to receiving the known output from the intermediary device 20, which may be used to determine the constraints of the sensor of the classification device 10. The intermediary device 20 may compare the known output to the sensor response from the classification device sensor 18, 19 to provide the classification device constraints.

By the intermediary device 20 interacting with the classification device 10 to determine the classification device constraints, issues with aged classification devices 10, which may have degraded over time due to component wear or ingress of dust and dirt, can be reduced or eliminated.

In one example, the classification device 10 is physically present in an audio capture environment which is provided by the intermediary device 20. The classification device 10 may be located at or near the intermediary device 20. The classification device 10 may be positioned at a location near to the microphone 28 of the intermediary device 20. When the classification device 10 is physically present near the intermediary device 20, for example in the audio capture environment provided by the intermediary device 20, short range communication, such as near field communication, may be used between the classification device 10 and the intermediary device 20 to facilitate the provision of data transfer between the classification device 10 and the intermediary device 20, in particular the provision of classification device constraints to the intermediary device 20. Further, a device ID can be received by the intermediary device 20, for the classification device 10, to ensure that classification device 10 receives the correct audio command model following the training of the model. The device ID can be received at the intermediary device 20 from the classification device 10, for example by near field communication.

When using near field communication the classification device 10 needs to be positioned close to the intermediary device 20 in order to transfer the classification device constraints from the classification device 10 to the intermediary device 20, typically within around 4 inches (10 centimetres).

By using near field communication to transfer classification device constraints from the classification device 10 to the intermediary device 20, power may be provided to the classification device 10 through inductive coupling between the classification device 10 and the intermediary device 20. Thus, the power limitations of the classification device 10 may not be detrimentally affected by the communication with the intermediary device 20 when using near field communication.

The classification device constraints may include the audio capability constraints of the classification device 10. The audio capability constraints of the classification device 10 may comprise a sampling rate for audio recording by the classification device 10. The sampling rate for audio recording by the classification device 10 may be relatively low, for example 4 kHz or 8 kHz. A lower sampling rate means less power use, so in the case of a classification device 10 which may be battery powered and have a limited battery life, lower sampling rates provide significant benefits in the use of power from the device battery during operation of the classification device 10. The sampling rate for audio recording by the classification device 10 may be lower than the sampling rate for audio recording by the intermediary device 20. The sampling rate for audio recording by the intermediary device 20 may be relatively high, for example 48 kHz or 96 kHz. The sampling rate for audio recording by the intermediary device 20 may be higher than the sampling rate for audio recording at the classification device 10.

Knowledge of the audio capability constraints of the classification device 10 prior to beginning the training process at the intermediary device 20 provides for optimisation of the training process, as the intermediary device 20 knows the sampling rate of the classification device 10 relative to its own sampling rate and can therefore understand how the training data received at the intermediary device 20 will differ from voice commands that will be provided, by a user, to the classification device 10 once the audio command model has been created and provided to the classification device 10. In other words, by understanding the differences in sampling rate between the classification device 10 and the intermediary device 20, the intermediary device 20 may modify or match the audio training data to the classification device constraints to optimise the model. So, if the intermediary device 20 usually records training data at say 40 kHz, it may, with knowledge of a lower sampling rate for the classification device 10, record the training data at the sampling frequency of the classification device, say 4 kHz. Alternatively, the intermediary device 20 may record training data at 40 kHz and then resample that training data at 4 kHz in a resampling process, which may be carried out at the intermediary device 20 or at a remote server 40 to which the intermediary device 20 may be connected or communicatively coupled.

The classification device constraints may also include one or more of processing capability constraints, data storage or memory constraints, and communication constraints. Processing capability constraints and/or data storage or memory constraints at the classification device 10 can prevent training a classification device 10 solely using the classification device 10. Therefore, the more extensive capabilities of an intermediary device 20 can be utilised to train an audio command model for subsequent transmission to the classification device 10.

In block 220 audio training data is received at the intermediary device 20. The audio training data may be received via a microphone 28 at the intermediary device 20. The audio training data comprises voice commands provided by a user which can be categorised against device functionality to be provided by the classification device 10. These voice commands are received during training of the audio command model, that is, during a training period for the audio command model. Alternatively, or in addition, other audio training data in the form of non-human or non-user sounds can be received at the intermediary device 20. For example, the sound of an opening door, a key being used in a lock, or the initialisation of machinery in a factory, can be used as audio training data to be mapped against certain device functionality.

Audio training data could be received whilst the intermediary device 20 is in a particular environment, free from interference by non-ideal environmental conditions, such as noisy environments. Alternatively, the audio training data can be averaged or filtered to ensure quality of data. Noise filtering can be applied to the audio training data to remove any erroneous noise, for example by applying amplification, pass, or attenuation, of some frequency bands or ranges in the audio training data, or any other known linear or non-linear audio filters.

As previously noted, the sampling rate for audio recording on the classification device 10 may be lower than the sampling rate for audio recording on the intermediary device 20. This may cause issues in the mapping of the audio training data to classification device functionality to provide an audio command model that can be used at the classification device 10.

In block 230, in order to reduce or prevent issues arising from the different audio capabilities of the classification device 10 and the intermediary device 20, the audio training data is matched to the classification device constraints to provide constrained audio training data, and in block 240 the constrained audio training data is mapped to classification device functionality to provide a classification device model in the form of an audio command model. The audio command model may comprise a table of correspondence between device functions and audio commands.

For example, when the intermediary device 20 is a mobile phone or similar device, an application running on that mobile phone or similar device may perform matching the audio training data to the classification device constraints to provide constrained audio training data, and mapping the constrained audio training data to classification device functionality to provide an audio command model, prior to transmission of the audio command model to the classification device 10.

In an example application for the process running on a mobile phone, the application may initially ask, or query the user, as to which word the user wishes to associate with a function. The user responds with an audio command, such as "open". The application may then ask, or query the user, if any other word is required to be associated with the function. The user may respond with a further audio command, such as "car". The application may then ask, or query the user, if any other word is required to be associated with the function. In order to end the user input, the user can say "no", or "stop" or some other keyword, or visually click a stop button in the application. In an alternative application for the process, the application may request a phrase from the user to obtain the full command in one data capture.

The application will then ask which function the user wishes the word, words, or phrase to be associated with, and the user can identify a function to associate. For example, the user can identify that the function is the opening of a vehicle 50, such as a car. The audio command can form a second factor of a two-factor authentication for such a function and/or a personalisation of a user experience for such a function as explained below. The application may then ask in which condition the function should be activated, this allows the creation of rules for operation of the classification device. In one arrangement, when the user is within a certain threshold distance from the car, for example twenty metres, and provides the audio command "open car", then it will be determined that the user wishes for the car to open with user experience personalisation, but if the user is further than the threshold distance from the car then it will not open the car. If the audio command in the audio command model, for that particular user, provides for personalisation of the user experience, then the audio command "open car" may indicate that the user wishes to open the car with user experience personalisation.

Alternatively, the system may comprise a distributed computing arrangement where some functions, such as matching the audio training data to the classification device constraints to provide constrained audio training data, and/or mapping the constrained audio training data to classification device functionality to provide an audio command model, can be carried out remote to the intermediary device 20, for example at a remote server network 40.

The intermediary device 20 may be connected to a server network 40, the server network 40 may then provide processing of matching the audio training data to the classification device constraints to provide constrained audio training data and/or mapping the constrained audio training data to classification device functionality to provide an audio command model. The audio command model can then be transmitted from the server network 40 to the intermediary device 20 for transfer to the classification device 10.

If long range communications are used to communicate with the classification device 10, then the function of transmitting the audio command model to the classification device 10 may also be carried out remote from the intermediary device 20, for example from the server network 40.

Therefore, one or more of the features of matching the audio training data to the classification device constraints to provide constrained audio training data, mapping the constrained audio training data to classification device functionality to provide an audio command model, and transmitting the audio command model to the classification device may be provided by a cloud based service, such as that provided by Alexa, or a similar voice assistant, through an Amazon Echo Dot, or similar device which has a microphone 28 for audio recording.

Following mapping of the constrained audio training data to the classification device functionality to provide a classification device model in the form of an audio command model, a process of pruning of the model can be carried out. This pruning can be carried out manually or automatically. The process of pruning increases the sparsity level of the model and therefore provides data compression by reducing the size of the decision trees in the model. Sections of the decision tree that are non-critical and redundant to classify instances can be removed. Therefore, in terms of the training of voice commands in the audio command model, the quality of the audio training data matters and the model may be optimised by discarding some of the audio training data, particularly that data which may be problematic for use with the model. Effectively, outliers in the audio training data can be identified and discarded, which may include noisy data or data which is particularly different to a majority of the training data.

In block 250 the audio command model is transmitted or pushed to the classification device 10 to provide a new set of capabilities or functions to the classification device 10. The audio command model, which is transmitted to the classification device 10 or received at the classification device 10, may be optimised through the pruning of the audio command model. The audio command model can be transmitted to the classification device 10 from the intermediary device 20, or from a remote server 40 if the audio command model is created remote from the intermediary device 20 and near field communications are not required by the system 100. Alternatively, the audio command model can be transmitted to the classification device 10 from a remote server 40 via the intermediary device 20, if the audio command model is created remote from the intermediary device 20 and near field communication is required to transmit the audio command model to the classification device 10 securely.

In one example, the classification device 10 is physically present in the audio capture environment provided by the intermediary device 20 such that short range communication, such as near field communication, can be used between the classification device 10 and the intermediary device 20 to facilitate the secure provision of the audio command model to the classification device 10.

When using near field communication the classification device 10 needs to be positioned close to the intermediary device 20 in order to transfer the audio command model to the classification device 10 from the intermediary device 20, typically within around 4 inches (10 centimetres).

In an example, when using near field communication, the audio command model may only be transmitted or pushed to the classification device 10 when the classification device 10 is in close proximity to the intermediary device 20, and the ID of the classification device 10 may be checked to ensure that the correct audio command model is being applied to the classification device 10.

As an added layer of security, the classification device 10 may perform a certain task to initiate or allow the transfer of the audio command model to the classification device 10. This task may be actuation of a button or other user engageable element 17 of the classification device 10.

By using near field communication to receive an audio command model for implementation at the classification device 10, from the intermediary device 20, the threat of malicious reprogramming of the classification device 10 is reduced, as such malicious reprogramming would need to occur using a third party device positioned close to the classification device 10, typically within around 4 inches (10 centimetres).

Also, by using near field communication to receive an audio command model for implementation at the classification device 10, from the intermediary device 20, power may be provided to the classification device 10 through inductive coupling between the classification device 10 and the intermediary device 20. Thus, the power limitations of the classification device 10 may not be detrimentally affected by the communication with the intermediary device 20 when using near field communication.

In examples where near field communication is used to transfer an audio command model to the classification device, the classification device 10 could be a device without its own power source, as the audio command model can be written into non-volatile memory 16 of the classification device 10 using the inductive coupling between the classification device 10 and the intermediary device 20 during near field communication. In order to physically operate such a device, that is to perform the functions of the classification device 10 in operation, energy can be harvested by the press of a function button on the classification device 10 to provide sufficient power to perform the desired function.

Following transmission of the audio command model to the classification device 10, the classification device 10 can receive operational voice commands from a user, that is voice commands intended to control the operation of an object, at a microphone 18 of the classification device 10.

In one embodiment, such operational voice commands are used in combination with a physical interaction with a user engageable element 17 on the classification device 10, by the user, in order to augment the level of security in the operation of the remotely controlled object.

Therefore, two factor authentication may be provided by such a classification device 10, where a first factor of the two factor authentication can be provided by the use of a button 17 on the classification device 10, or by some other physical interaction with a user engageable element 17 on the classification device 10. The second factor of the two factor authentication can then be provided by the user's voice, in the form of an operational voice command provided by the user, as a biometric factor to augment the physical touch based interaction with the user engageable element 17 of the classification device 10, where the user's voice, in the form of operational voice commands, can provide commands that are mapped to device functionality in the audio command model. An unknown voice will not be recognised in the audio command model as a second factor and therefore will fail to operate the classification device 10.

Alternatively, or in addition, by providing an audio command model to the classification device 10, the classification device 10 can be configured or arranged to receive operational voice commands from one or more users to augment the operation of the classification device 10 to control operation of an object and provide a personalised user experience. For example, an operational voice command may be a voice command mapped for a user, in the audio command model, to a function which provides a personalised control operation for an object for that user.

Voice commands can be mapped, in the audio command model, for a plurality of users to provide personalisation of the control operation for the object for the plurality of users.

The audio command model may be trained to recognise different users' voices such that a different user experience can be provided to each user for a given function.

An operational voice command, for example a spoken command such as "open", can be mapped, in the audio command model, for use by a first user, where the result of using that command is mapped to personalisation of the vehicle 50 for that first user. That is, the operational voice command causes transmission of a signal from the classification device 10 to the vehicle 50 to cause operation of vehicle functions personalised to that first user. The same operational voice command, that is the spoken command "open", can also be mapped, in the audio command model, for use by a second user, where the result of using that command is mapped to personalisation of the vehicle 50 for that second user. That is, the operational voice command causes transmission of a signal from the classification device 10 to the vehicle 50 to cause operation of vehicle functions personalised to that second user.

The personalisation of the commands is dependent on voice recognition techniques that can distinguish the voice of one user over that of another. Such techniques would be well known to the person skilled in the art.

In some embodiments an operational voice command, for example the spoken command "open", that is mapped to one or more specific users, can also be recognised when spoken by a generic user, for which the voice command has not been specifically mapped. That is, the operational voice command is a recognised command, but is spoken in an unknown voice. In other words, for a user who has not provided audio training data, it may be possible to still provide an operational voice command. In such a case there would be no personalisation of the vehicle 50, though a basic function, such as opening a car, may still be performed.

Personalisation for other arrangements can also be provided, such that, for instance, a building 60 or room in a building 60 is personalised to the user upon receipt of an operational voice command, from the user, that is mapped in the audio command model.

In some examples, the classification device 10 is a single click device, that is, a device with a single button 17 or other physical user input 17. In other examples there may be a separate button 17 or physical user input 17 for a voice command input whilst other functions of the classification device 10 remain unmodified, that is functions such as a general car unlock, car lock, trunk or boot open, and alarm, can be present, to be operated without voice command input. In yet further examples, the functions of the classification device 10, such as would be provided by car unlock, car lock, trunk or boot open and alarm buttons, may be augmented with an operational voice command input providing a personalised user experience when both inputs are applied.

In an embodiment where a vehicle 50 is the object to be controlled, the vehicle 50, in response to an operational voice command, may apply personalisation of vehicle components for a particular user. That is, one or more customisable features of a vehicle 50 can be adjusted in response to the operational voice command from a particular user. The function can be automatic and transparent for the user. So, for example, a seat position, steering wheel position, mirror positions, radio settings, climate control settings, or any other customisable feature 52 of a vehicle 50 can be adjusted in response to the operational voice command from a particular user. These settings may be different for different users providing equivalent operational voice commands.

In terms of security, the audio command model can be trained to recognise different voices from different users, such that even if the spoken commands relating to a certain function for different users is the same, the function carried out can be different. For example, a different user experience can be provided to each user the model is trained for. In relation to the example of a vehicle 50, the seat positions, steering wheel positions, mirror positions, radio settings, climate control settings, or any other customisable features 52 of the vehicle 50 can be different for each user.

Some functionality can be prohibited for some users based on their biometric signature, and this can be set in the audio command model. In the example relating to vehicle control, the starting of the vehicle 50 can be limited to a main user, or nominated drivers of the vehicle 50, to prevent, for instance, a child or an unauthorised user from starting the vehicle 50. In an example related to building control, opening of a secure door 62 can be limited to authorised users of that door only. The identification of the authorised or unauthorised users can be set using an interface such as a mobile phone application, which may provide a graphical user interface or an audio user interface, or a voice assistant, which may provide an audio user interface. Some users may be able to command a limited set of functions with the device, such that critical functions, for example, starting a vehicle 50, or opening a secure door 62, can only be performed when an authorised user provides the operational voice command. Other functions that are non-critical, such as opening a car door or switching on lights may be carried out by the users who are not authorised to instruct critical functions.

Different operational voice commands can be used by different users to carry out the same function. For example, a first user may use the word "open" to open a door of a vehicle 50 or building 60, but a second user may use the phrase "1, 2, 3", for example, to carry out the same function of opening the door of the vehicle 50 or building 60. By mapping words or phrases to certain functions that are not direct commands an additional layer of security can be provided. In this way, by a user using a word or phrase not directly associated with the function it performs, another person would be less likely to be able to circumvent the voice command security by imitating the user to trick the device into carrying out a command to perform a function.

In some embodiments, the user can switch the classification device to operate in different modes, and the audio command model can be trained to recognise operational voice commands from both modes for a particular user. In a first mode the user's operational voice commands are commands directly corresponding to the actions the user wishes to take. For example an "open car" voice command is intended to lead to opening of the car. In a second mode the user commands are coded to assist in preventing misuse of the classification device. In the second mode a user's operational voice command for opening a car may be "green", or any other unrelated word or phrase.

When the audio command model comprises a table of correspondence between device functions and operational voice commands, for each device function there may be multiple possible operational voice commands, with different operational voice commands being provided for different users. Some of the device functions in the table may only be available to authorised users, or conversely some of the device functions in the table may be unavailable to unauthorised users.

In relation to sensor characterisation for an audio command model, the intermediary device 20 may characterise the microphone 18, or similar audio recording component, in the classification device by interacting with the classification device 10 to determine the classification device constraints. The intermediary device 20 may provide a predetermined audible tone, or series of tones, to the microphone 18 of the classification device 10, where the microphone 18 of the classification device 10 then detects the received tone or tones and records a suitable audio spectrum. Data, which may be raw data or processed data of the audio spectrum, relating to the received tone or tones, is then provided to the intermediary device 20 which can then compare the originally transmitted tone or tones to the data received from the classification device 10. In this way, the audio spectral sensitivity of the microphone 18 of the classification device 10 can be determined and used in the determination of the classification device constraints.

Whilst most of the method for an arrangement providing an image command model will be similar to that of the method described above in relation to an audio command model, the method for providing the classification device 10 with an image command model has a few differences.

In an example, when an image command model is to be provided to the classification device 10, the classification device 10 may be physically present in an image capture environment which is provided by the intermediary device 20. The classification device 10 may be located at or near the intermediary device 20. The classification device 10 may be a positioned at a location near to a camera 29 of the intermediary device 20. When the classification device 10 is physically present near the intermediary device 20, short range communication, such as near field communication, may be used between the classification device 10 and the intermediary device 20 to facilitate the provision of data transfer between the classification device 10 and the intermediary device 20, in particular the provision of classification device constraints to the intermediary device 20. Further, a device ID can be received by the intermediary device 20, for the classification device 10, to ensure that classification device 10 receives the correct image command model following the training of the model. The device ID can be received at the intermediary device 20 from the classification device 10, for example by near field communication.

The classification device constraints may include the image capability constraints of the classification device 10. The image capability constraints of the classification device 10 may comprise resolution, spectral sensitivity, intensity, or other image properties for image recording by the classification device 10. For example, the resolution for image recording by the classification device may be relatively low, for example 100 by 100 pixels. A lower image resolution means less power use, so in the case of a classification device 10 which may be battery powered and have a limited battery life, lower image resolution provides significant benefits in the use of power from the device battery during operation of the classification device 10. The image resolution for image recording by the classification device 10 may be lower than the image resolution for image recording by the intermediary device 20. The image resolution for image recording by the intermediary device 20 may be relatively high, for example 400 by 400 pixels. The image resolution for image recording by the intermediary device 20 may be higher than the image resolution for image recording at the classification device 10. Of course, differences in other image capability constraints can be similarly determined between the classification device 10 and the intermediary device 20.

Knowledge of the image capability constraints of the classification device 10 prior to beginning the training process at the intermediary device 20 provides for optimisation of the training process, as the intermediary device 20 knows the imaging capabilities of the classification device 10 relative to its own imaging capabilities and can therefore understand how the training data received at the intermediary device 20 will differ from image data that will be provided, by a user, to the classification device 10, via a camera 19 or similar device on the classification device 10, once the image command model has been created and provided to the classification device 10. In other words, by understanding the differences in, for example, image resolution between the classification device 10 and the intermediary device 20, the intermediary device 20 may modify or match the image training data to the classification device constraints to optimise the model. So, if the intermediary device 20 usually records training data at say 400 by 400 pixels, it may, with knowledge of a lower image resolution for the classification device 10, record the training data at the image resolution of the classification device 10, say 100 by 100 pixels. Alternatively, the intermediary device 20 may record training data at a higher resolution, for example 400 by 400 pixels, and then resample that training data to match the image resolution of the classification device 10, for example 100 by 100 pixels, in a resampling process, which may be carried out at the intermediary device 20 or at a remote server 40 to which the intermediary device 20 may be connected or communicatively coupled.

In block 220 image training data is received at the intermediary device 20. The image training data may be received via a camera 29 at the intermediary device 20. The image training data comprises visual images or image commands provided by a user which can be categorised against device functionality to be provided by the classification device 10. These visual images or image commands are received during training of the image command model, that is, during a training period for the image command model.

Image training data could be received whilst the intermediary device 20 is in a particular environment, free from interference from non-ideal environmental conditions, such as noisy environments. Alternatively, the image training data can be averaged or filtered to ensure quality of data. For example, automatic brightness or contrast filtering can be provided to the captured images to normalise brightness or contrast levels. A Gaussian filter can be provided to reduce image noise in the image training data. Median or mean filters can be applied to the received image training data to reduce noise in the image training data.

In block 230, in order to reduce or prevent issues arising from the different image capabilities of the classification device 10 and the intermediary device 20, the image training data is matched to the classification device constraints to provide constrained image training data, and in block 240 the constrained image training data is mapped to classification device functionality to provide a classification device model in the form of an image command model. The image command model may comprise a table of correspondence between device functions and recognised images forming image commands.

For example, when the intermediary device 20 is a mobile phone or similar device, an application running on that mobile phone or similar device may perform matching the image training data to the classification device constraints to provide constrained image training data, and mapping the constrained image training data to classification device functionality to provide an image command model, prior to transmission of the image command model to the classification device 10.

In an example application for the process running on a mobile phone, the application may initially ask for the user to provide an image that the user wishes to associate with a function. The user responds by providing such an image through the camera 29 of the intermediary device 20. In an extension to, or alternative application for, the process, the application may request a series of images from the user to obtain an image command, that is a visual command or cue, relating to a function.

The application will then ask which function the user wishes the image or images of the image command to be associated with, and the user can identify a function to associate. For example, the user can identify that the function is the opening of a vehicle 50, such as a car. The image command can form a second factor of a two-factor authentication for such a function and/or a personalisation of a user experience for such a function as explained below. The application may then ask in which condition the function should be activated, this allows the creation of rules for operation of the classification device 10. In one arrangement, when the user is within a certain threshold distance from the car, for example twenty metres, and provides an image command, for example in the form of an image of the user's face or hands, or another object, then it will be determined that the user wishes for the car to open with user experience personalisation, but if the user is further than the threshold distance from the car then it will not open the car. If the image command in the image command model, for that particular user, provides for personalisation of the user experience, then the image command, relating to the user's face for example, may indicate that the user wishes to open the car with user experience personalisation.

One or more of the features of matching the image training data to the classification device constraints to provide constrained image training data, mapping the constrained image training data to classification device functionality to provide an image command model, and transmitting the image command model to the classification device 10 may be provided by a cloud based service, such as that provided through an application on a mobile phone or similar device which has a camera 29 for image recording.

Following mapping of the constrained image training data to the classification device functionality to provide a classification device model in the form of an image command model, a process of pruning of the model can be carried out, as described above in relation to audio command model pruning.

In block 250 the image command model is transmitted or pushed to the classification device 10 to provide a new set of capabilities or functions to the classification device 10. The image command model, which is transmitted to the classification device 10 or received at the classification device 10, may be optimised through the pruning of the image command model. The image command model can be transmitted to the classification device 10 from the intermediary device 20, or from a remote server 40 if the image command model is created remote from the intermediary device 20 and near field communications are not required by the system. Alternatively, the image command model can be transmitted to the classification device 10 from a remote server 40 via the intermediary device 20, if the image command model is created remote from the intermediary device 20 and near field communication is required to transmit the image command model to the classification device 10 securely.

Following transmission of the image command model to the classification device 10, the classification device 10 can receive operational image commands from a user, that is image commands intended to control the operation of an object.

In one embodiment, such operational image commands are used in combination with a physical interaction with a user engageable element 17 on the classification device 10, by the user, in order to augment the level of security in the operation of the remotely controlled object.

Therefore, two factor authentication may be provided by such a classification device 10, where a first factor of the two factor authentication can be provided by the use of a button 17 on the classification device 10, or by some other physical interaction with a user engageable element 17 on the classification device 10. The second factor of the two factor authentication can then be provided by a user image, in the form of an operational image command provided by the user, as a biometric factor to augment the physical touch based interaction with the user engageable element 17 of the classification device 10, where the user image, in the form of operational image commands, can provide commands that are mapped to device functionality in the image command model. An unknown image will not be recognised in the image command model as a second factor and therefore will fail to operate the classification device 10.

Alternatively, or in addition, by providing an image command model to the classification device 10, the classification device can be configured or arranged to receive operational image commands from one or more users to augment the operation of the classification device 10 to control operation of an object and provide a personalised user experience. For example, an operational image command may be an image command mapped for a user, in the image command model, to a function which provides a personalised control operation for an object for that user.

Image commands can be mapped, in the image command model, for a plurality of users to provide personalisation of the control operation for the object for the plurality of users.

The image command model may be trained to recognise different user images, for example different user's faces or hand gestures, such that a different user experience can be provided to each user for a given function.

The personalisation of the commands is dependent on image recognition techniques that can distinguish, for example, the face of one user over that of another. Such techniques would be well known to the person skilled in the art.

Personalisation for other arrangements can also be provided, such that, for instance, a building 60 or room in a building 60 is personalised to the user upon receipt of an operational image command, from the user, that is mapped in the image command model.

In some examples, the classification device 10 is a single click device, that is, a device with a single button 17 or other physical user input 17. In other examples there may be a separate button 17 or physical user input 17 for an image command input whilst other functions of the classification device 10 remain unmodified, that is functions such as a general car unlock, car lock, trunk or boot open, and alarm, can be present, to be operated without image command input. In yet further examples, the functions of the classification device 10, such as would be provided by car unlock, car lock, trunk or boot open and alarm buttons, may be augmented with an operational image command input providing a personalised user experience when both inputs are applied.

In an embodiment where a vehicle 50 is the object to be controlled, the vehicle 50, in response to an operational image command, may apply personalisation of vehicle components for a particular user. That is, one or more customisable features of a vehicle 50 can be adjusted in response to the operational image command from a particular user. The function can be automatic and transparent for the user. So, for example, a seat position, steering wheel position, mirror positions, radio settings, climate control settings, or any other customisable feature 52 of a vehicle 50 can be adjusted in response to the operational image command, for example the imaging of a particular user's face. These settings may be different for different users providing equivalent operational image commands.

Some functionality can be prohibited for some users based on their biometric signature, and this can be set in the image command model. In the example relating to vehicle control, the starting of the vehicle 50 can be limited to a main user, or nominated drivers of the vehicle 50, to prevent, for instance, a child or an unauthorised user from starting the vehicle 50. In an example related to building control, opening of a secure door 62 can be limited to authorised users of that door only, and can be carried out without a key for example. The identification of the authorised or unauthorised users can be set using an interface such as a mobile phone application, which may provide a graphical user interface. Some users may be able to command a limited set of functions with the device, such that critical functions, for example, starting a vehicle 50, or opening a secure door 62, can only be performed when an authorised user provides the operational image command. Other functions that are non-critical, such as opening a car door or switching on lights may be carried out by the users who are not authorised to instruct critical functions.

When the image command model comprises a table of correspondence between device functions and operational image commands, for each device function there may be multiple possible operational image commands, with different operational image commands being provided for different users. Some of the device functions in the table may only be available to authorised users, or conversely some of the device functions in the table may be unavailable to unauthorised users.

In relation to sensor characterisation for an image command model, the intermediary device 20 may characterise the camera 19, or similar image recording component 19, in the classification device 10 by interacting with the classification device 10 to determine the classification device constraints. The intermediary device 20 may provide a predetermined image output, for example an image output of predetermined resolution, colour spectrum, and intensity, to the camera 19 of the classification device 10, where the camera 19 of the classification device 10 then detects and records the received image output from the intermediary device 20. Data, which may be raw data or processed data relating to the detected image is then provided to the intermediary device 20 which can then compare the originally transmitted image output to the data received from the classification device 10. In this way, the imaging capabilities of the camera 19 of the classification device 10 can be determined and used in the determination of the classification device constraints.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. The computer readable storage medium may be a non-transitory computer readable storage medium encoded with instructions that, when performed by a processing means, cause performance of the method described above. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Further embodiments may relate to the following numbered clauses:

1. A method for training a classification device, the method comprising: receiving classification device constraints at an intermediary device; receiving training data at the intermediary device; matching the training data to the classification device constraints to provide constrained training data; mapping the constrained training data to classification device functionality to provide a command model; and transmitting the command model to the classification device.

2. A method according to clause 1, wherein the classification device provides one or more functions to control the operation of an object.

3. A method according to clause 2, wherein the classification device is a vehicle remote control device for providing functions to control a vehicle, the functions comprising one or more of: locking or unlocking a vehicle door; opening or closing a vehicle door, trunk, boot, or other entry point to the vehicle; controlling an alarm of the vehicle; or controlling other automatable functions of the vehicle, or, wherein the classification device is a building remote control device for providing functions to control a building, the functions comprising one or more of: opening and closing blinds or shutters; turning lights on and off; controlling an alarm system; or controlling other automatable functions within the building.

4. A method according to any of clauses 1 to 3, wherein the training data comprises audio training data and the audio training data is provided by a user enunciating voice commands during training of the command model.

5. A method according to clause 4, wherein the intermediary device comprises a microphone such that the audio training data can be received by the microphone.

6. A method according to clause 4 or clause 5, wherein the classification device constraints include audio capability constraints of the classification device.

7. A method according to clause 6, wherein the audio capability constraints indicate a sampling rate for audio recording on the classification device which is lower than a sampling rate for audio recording on the intermediary device.

8. A method according to any of clauses 4 to 7, wherein the command model enables a two factor authentication process, where a first factor of the two factor authentication is provided by a physical interaction with a user engageable element on the classification device, and a second factor of the two factor authentication is provided by an operational voice command which is provided by the user, the operational voice command being a voice command which is mapped to classification device functionality in the command model.

9. A method according to any of clauses 4 to 8, wherein the command model enables a personalised user experience, the classification device receiving operational voice commands from one or more users to control the operation of an object to provide a personalised user experience.

10. A method according to clause 9, wherein the operational voice command is a voice command mapped in the command model to a function whereby that function personalises the operation of the object for a user.

11. A method according to clause 10, wherein voice commands are mapped in the command model for a plurality of users to provide personalisation of operation of the object for the plurality of users.

12. A method according to clause 10 or clause 11, wherein the object is controlled, in response to an operational voice command, to apply personalisation of the object for a particular user by adjusting one or more customisable features of the object.

13. A method according to any of clauses 1 to 3, wherein the training data comprises image training data and the image training data is provided by a user imaging their face, hands, or other object, during training of the command model.

14. A method according to clause 13, wherein the intermediary device comprises a camera such that the image training data can be received by the camera.

15. A method according to clause 13 or clause 14, wherein the classification device constraints include image capability constraints of the classification device.

16. A method according to clause 15, wherein the image capability constraints indicate an imaging resolution for image recording on the classification device which is lower than an imaging resolution for image recording on the intermediary device.

17. A method according to any of clauses 13 to 16, wherein the command model enables a two factor authentication process, where a first factor of the two factor authentication is provided by a physical interaction with a user engageable element on the classification device, and a second factor of the two factor authentication is provided by an image input which is provided by the user, the image input being an input which is mapped to classification device functionality in the command model.

18. A method according to any of clauses 13 to 17, wherein the command model enables a personalised user experience, the classification device receiving operational image inputs from one or more users to control the operation of an object to provide a personalised user experience.

19. A method according to clause 18, wherein the operational image input is an image input mapped in the command model to a function whereby that function personalises the operation of the object for a user.

20. A method according to clause 19, wherein image inputs are mapped in the command model for a plurality of users to provide personalisation of operation of the object for the plurality of users.

21. A method according to clause 19 or clause 20, wherein the object is controlled, in response to an operational image input, to apply personalisation of the object for a particular user by adjusting one or more customisable features of the object.

22. A method according to any of clauses 1 to 21, wherein the classification device constraints are transmitted from the classification device to the intermediary device via a communication channel and the command model is transmitted from the intermediary device to the classification device via the communication channel.

23. A method according to clause 22, wherein the communication channel comprises near field communication.

24. A method according to clause 23, wherein the intermediary device provides power to the classification device through inductive coupling between the classification device and the intermediary device, during near field communication.

25. A method according to clause 24, wherein the command model is written into a non-volatile memory of the classification device using the inductive coupling between the classification device and the intermediary device, during near field communication.

26. A method according to any of clauses 1 to 25, wherein the classification device constraints include one or more of processing capability constraints, data storage constraints, and communication constraints.

27. A method according to any of clauses 1 to 26, wherein the intermediary device characterises a sensor of the classification device to determine the classification device constraints by providing a known output to the sensor of the classification device and comparing the known output to a sensor response from the classification device.

28. An intermediary device comprising: communication circuitry to: receive classification device constraints; and receive training data; and processing circuitry to: match the training data to the classification device constraints to provide constrained training data; and map the constrained training data to classification device functionality to provide a command model; wherein the communication circuitry transmits the command model to the classification device.

29. A system for training a classification device, comprising: an intermediary device to: receive classification device constraints; receive training data; match the training data to the classification device constraints to provide constrained training data; map the constrained training data to classification device functionality to provide a command model; and transmit the command model to the classification device; and a classification device to: provide the classification device constraints to the intermediary device; and receive the command model from the intermediary device.

30. A non-transitory computer readable storage medium encoded with instructions that, when performed by a processing means, cause performance of the method of any one of clauses 1 to 27.

The invention claimed is:

1. A method for training a classification device, the method comprising:
receiving classification device constraints indicative of limited capabilities of the classification device at an intermediary device;
receiving training data at the intermediary device;
determining, at the intermediary device, classification device functionality comprising one or more functions which the classification device can perform;
matching, at the intermediary device, the training data to the classification device constraints to provide constrained training data;
mapping, at the intermediary device, the constrained training data to classification device functionality to provide a command model, such that the command model is to define a function of the one or more functions which the classification device is to perform responsive to a user command and such that the defined function is to personalise an operation of an object for a user; and
transmitting, from the intermediary device, the command model to the classification device,
wherein:
the training data comprises image training data; and
the command model enables a personalised user experience, the classification device receiving operational image inputs from one or more users to control operation of an object to provide the personalised user experience.

2. The method according to claim 1, wherein the intermediary device characterises a sensor of the classification device to determine the classification device constraints by providing a known output to the sensor of the classification device and comparing the known output to a sensor response from the classification device.

3. The method according to claim 1, wherein the classification device constraints are transmitted from the classification device to the intermediary device via a communication channel and the command model is transmitted from the intermediary device to the classification device via the communication channel, optionally wherein the communication channel comprises near field communication.

4. The method according to claim 3, wherein the intermediary device provides power to the classification device through an inductive coupling between the classification device and the intermediary device, during near field communication, optionally wherein the command model is written into a non-volatile memory of the classification device using the inductive coupling between the classification device and the intermediary device, during near field communication.

5. The method according to claim 1, wherein at least one of the operational image inputs is an image input mapped in the command model to a function such that the function personalises the operation of the object for a user, optionally wherein image inputs are mapped in the command model for a plurality of users to provide personalisation of operation of the object for the plurality of users.

6. The method according to claim 5, wherein the object is controlled, in response to an operational image input, to apply personalisation of the object for a particular user by adjusting one or more customisable features of the object.

7. The method according to claim 1, wherein the classification device provides one or more functions to control operation of an object.

8. The method according to claim 7, wherein the classification device is a vehicle remote control device for providing functions to control a vehicle, the functions comprising one or more of: locking or unlocking a vehicle door; opening or closing a vehicle door, trunk, boot, or other entry point to the vehicle; controlling an alarm of the vehicle; or controlling other automatable functions of the vehicle, or, wherein the classification device is a building remote control device for providing functions to control a building, the functions comprising one or more of: opening and closing blinds or shutters; turning lights on and off; controlling an alarm system; or controlling other automatable functions within the building.

9. The method according to claim 1, wherein the image training data is provided by a user imaging their face, hands, or other object, during training of the command model.

10. The method according to claim 9, wherein the classification device constraints include image capability constraints of the classification device, optionally wherein the image capability constraints indicate an imaging resolution for image recording on the classification device which is lower than an imaging resolution for image recording on the intermediary device.

11. The method according to claim 9, wherein the command model enables a two factor authentication process, where a first factor of the two factor authentication process is provided by a physical interaction with a user engageable element on the classification device, and a second factor of the two factor authentication process is provided by an image input which is provided by the user, the image input being an input which is mapped to classification device functionality in the command model.

12. The method according to claim 1, wherein the training data comprises audio training data and the audio training data is provided by a user enunciating voice commands during training of the command model.

13. The method according to claim 12, wherein the classification device constraints include audio capability constraints of the classification device, optionally wherein the audio capability constraints indicate a sampling rate for audio recording on the classification device which is lower than a sampling rate for audio recording on the intermediary device.

14. The method according to claim 12, wherein the command model enables a two factor authentication process, where a first factor of the two factor authentication process is provided by a physical interaction with a user engageable element on the classification device, and a second factor of the two factor authentication process is provided by an operational voice command which is provided by the user, the operational voice command being a voice command which is mapped to classification device functionality in the command model.

15. The method according to claim 12, wherein the command model enables a personalised user experience, the classification device receiving operational voice commands from one or more users to control operation of an object to provide a personalised user experience.

16. The method according to claim 15, wherein at least one of the operational voice commands is a voice command mapped in the command model to a function whereby that function personalises the operation of the object for a user, optionally wherein voice commands are mapped in the command model for a plurality of users to provide personalisation of operation of the object for the plurality of users.

17. The method according to claim 16, wherein the object is controlled, in response to an operational voice command, to apply personalisation of the object for a particular user by adjusting one or more customisable features of the object.

18. An intermediary device comprising:
communication circuitry to:
receive classification device constraints; and
receive training data; and
processing circuitry to:
determine a classification device functionality of a classification device, the classification device functionality comprising one or more functions which the classification device can perform;
match the training data to the classification device constraints to provide constrained training data; and
map the constrained training data to the classification device functionality to provide a command model, where the command model is to define a function of the one or more functions which the classification device is to perform responsive to a user command and such that the defined function is to personalise an operation of an object for a user, wherein:
the communication circuitry transmits the command model to the classification device;
the training data comprises image training data; and
the command model enables a personalised user experience, the classification device to receive operational image inputs from one or more users to control operation of an object to provide the personalised user experience.

19. A system for training a classification device, comprising:
an intermediary device to:
receive classification device constraints;
receive training data;
determine classification device functionality comprising one or more functions which the classification device can perform;
match the training data to the classification device constraints to provide constrained training data;
map the constrained training data to the classification device functionality to provide a command model; and
transmit the command model to the classification device; and
a classification device to:
provide the classification device constraints to the intermediary device; and
receive the command model from the intermediary device, where the command model is to define a function of the one or more functions which the classification device is to perform responsive to a user command such that the defined function is to personalise an operation of an object for a user, wherein:
the training data comprises image training data; and
the command model enables a personalised user experience, the classification device to receive operational image inputs from one or more users to control operation of an object to provide the personalised user experience.

* * * * *